(12) United States Patent
Pan

(10) Patent No.: US 9,413,650 B2
(45) Date of Patent: *Aug. 9, 2016

(54) LIGHTWEIGHT CONTROL-PLANE SIGNALING FOR AGGREGATION DEVICES IN A NETWORK

(71) Applicant: Brixham Solutions Ltd., Tortola (VG)

(72) Inventor: Ping Pan, San Jose, CA (US)

(73) Assignee: Brixham Solutions Ltd. (VG)

( * ) Notice: Subject to any disclaimer, the term of this patent is extended or adjusted under 35 U.S.C. 154(b) by 233 days.

This patent is subject to a terminal disclaimer.

(21) Appl. No.: 14/307,454

(22) Filed: Jun. 17, 2014

(65) Prior Publication Data

US 2014/0341036 A1  Nov. 20, 2014

Related U.S. Application Data

(63) Continuation of application No. 11/486,389, filed on Jul. 12, 2006, now Pat. No. 8,811,392.

(60) Provisional application No. 60/698,893, filed on Jul. 12, 2005.

(51) Int. Cl.
| | |
|---|---|
| *G01R 31/08* | (2006.01) |
| *H04L 12/721* | (2013.01) |
| *H04L 12/723* | (2013.01) |
| *H04L 12/701* | (2013.01) |
| *H04L 12/851* | (2013.01) |

(52) U.S. Cl.
CPC ............ *H04L 45/68* (2013.01); *H04L 45/00* (2013.01); *H04L 45/50* (2013.01); *H04L 45/507* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 5,920,705 A | 7/1999 | Lyon et al. | |
| 6,167,051 A * | 12/2000 | Nagami | H04L 12/1886 370/395.2 |
| 6,347,088 B1 | 2/2002 | Katou et al. | |
| 6,374,303 B1 | 4/2002 | Armitage et al. | |
| 6,430,184 B1 | 8/2002 | Robins et al. | |
| 6,546,427 B1 | 4/2003 | Ehrlich | |
| 6,574,477 B1 | 6/2003 | Rathunde | |
| 6,621,793 B2 | 9/2003 | Widegren et al. | |
| 6,665,273 B1 | 12/2003 | Goguen et al. | |
| 6,680,943 B1 | 1/2004 | Gibson et al. | |
| 6,738,354 B1 * | 5/2004 | Ashwood Smith | A61N 7/02 370/248 |
| 6,751,684 B2 * | 6/2004 | Owen | H04L 47/10 370/231 |
| 6,813,271 B1 | 11/2004 | Cable | |

(Continued)

OTHER PUBLICATIONS

Office Action mailed Dec. 3, 2015 for U.S. Appl. No. 14/864,689, 14 pages.

(Continued)

*Primary Examiner* — John Blanton
*Assistant Examiner* — Thinh Tran
(74) *Attorney, Agent, or Firm* — Patents and Licensing LLC; Daniel W. Juffernbruch; John G. Fijolek

(57) ABSTRACT

Providing a label is disclosed. A first message is transmitted to an access device where the first message includes a set of available labels. A second message is received from the access device where the second message includes a label from the set of available labels selected to be used by the access device. The set of available labels is updated to account for the label selected by the access device.

20 Claims, 6 Drawing Sheets

(56) References Cited

U.S. PATENT DOCUMENTS

| | | | |
|---|---|---|---|
| 6,845,389 | B1 | 1/2005 | Sen et al. |
| 6,985,488 | B2 | 1/2006 | Pan et al. |
| 7,050,396 | B1 | 5/2006 | Cohen et al. |
| 7,200,104 | B2 | 4/2007 | Saleh et al. |
| 7,436,782 | B2 | 10/2008 | Ngo et al. |
| 7,697,528 | B2 | 4/2010 | Parry |
| 2001/0021175 | A1 | 9/2001 | Haverinen et al. |
| 2001/0023453 | A1 | 9/2001 | Sundqvist |
| 2002/0112072 | A1 | 8/2002 | Jain et al. |
| 2002/0141393 | A1 | 10/2002 | Eriksson |
| 2002/0146026 | A1 | 10/2002 | Unitt et al. |
| 2003/0002482 | A1 | 1/2003 | Kubler et al. |
| 2003/0039237 | A1 | 2/2003 | Forslow |
| 2003/0117950 | A1 | 6/2003 | Huang |
| 2004/0105459 | A1 | 6/2004 | Mannam |
| 2004/0114595 | A1 | 6/2004 | Doukai et al. |
| 2004/0133692 | A1 | 7/2004 | Blanchet et al. |
| 2004/0151159 | A1 | 8/2004 | Xu et al. |
| 2004/0156313 | A1 | 8/2004 | Hofmeister |
| 2004/0174865 | A1 | 9/2004 | O'Neill |
| 2004/0252717 | A1 | 12/2004 | Solomon et al. |
| 2005/0018605 | A1 | 1/2005 | Foote et al. |
| 2005/0044262 | A1 | 2/2005 | Luo |
| 2005/0147104 | A1 | 7/2005 | Ould-Brahim |
| 2005/0220148 | A1 | 10/2005 | DelRegno et al. |
| 2005/0237927 | A1 | 10/2005 | Kano et al. |
| 2005/0286558 | A1 | 12/2005 | Ould-Brahim et al. |
| 2006/0002423 | A1 | 1/2006 | Rembert et al. |
| 2006/0018252 | A1 | 1/2006 | Sridhar |
| 2006/0046658 | A1 | 3/2006 | Cruz |
| 2006/0047851 | A1 | 3/2006 | Voit |
| 2006/0090008 | A1 | 4/2006 | Guichard et al. |
| 2006/0146832 | A1 | 7/2006 | Rampal |
| 2006/0187856 | A1 | 8/2006 | Booth et al. |
| 2006/0190570 | A1 | 8/2006 | Booth, III et al. |
| 2006/0233167 | A1 | 10/2006 | McAllister |
| 2007/0053366 | A1 | 3/2007 | Booth, III |
| 2007/0127479 | A1 | 6/2007 | Sinicrope |
| 2007/0206607 | A1 | 9/2007 | Chapman |
| 2008/0031129 | A1 | 2/2008 | Arseneault et al. |
| 2008/0253367 | A1 | 10/2008 | Ould-Brahim |
| 2009/0161544 | A1* | 6/2009 | Kelly ............... H04L 43/026 370/232 |

OTHER PUBLICATIONS

Notice of Allowance mailed May 28, 2015 for U.S. Appl. No. 11/486,432, 44 pages.
Afferton et al., Ethernet Transport over Wide Area Networks, Packet-Aware Transport for Metro Networks, IEEE Communications Magazine, Mar. 2004.
Martini et al., Pseudowire Setup and Maintenance using the Label Distribution Protocol (LDP), Network Working Group, Apr. 2006.
Anderson et al., LDP Specification, Network Working Group, Jan. 2001.
Bryant et al., Pseudo Wire Emulation Edge-to-Edge (PWE3) Architecture, Network Working Group, Mar. 2005.
Martini et al., Encapsulation Methods for Transport of Ethernet over MPLS Networks, Network Working Group, Apr. 2006.
Martini et al., Encapsulation Methods for Transport of Frame Relay over Mpls Networks, Network Working Group, Feb. 2006.
Vainshtein et al., Structure—Agnostic Time Division Multiplexing (TDM)over Packet (SAtoP), Network Working Group, Jun. 2006.
Metz et al., Pseusdowire Attachment Identifiers for Aggregation and VPN Autodiscovery, PWE3 Working Group, Feb. 25, 2006.
Martini et al., Dynamic Placement of Multi Segment Pseudo Wires, PWE3 Working Group, Jun. 2006.
Office Action dated Nov. 24, 2008 for U.S. Appl. No. 11/486,389, 24 pages.
Office Action dated Nov. 19, 2008 for U.S. Appl. No. 11/486,432.
Martini et al., "Pseudowire Setup and Maintenance using LDP", Network Working Group, Mar. 2005.
Office Action dated Jul. 7, 2009 for U.S. Appl. No. 11/486,389, 37 pages.
Theimer et al. "Requirements for OAM Functionality in MPLS", Oct. 1999, watersprings.
Office Action dated Aug. 31, 2010 for U.S. Appl. No. 11/486,389, 17 pages.
Harry Newton, "Nevvton's Telecom Dictionary", 23rd updated and Expanded Edition, Flatiron Publishing, New York, Mar. 2007.
Office Action dated Aug. 31, 2010 for U.S. Appl. No. 11/486,432.
Braden et al., Integrated Services in the Internet Architecture: an overview, Networking Working Group, Jun. 1994.
Blake et al., An Architecture for Differentiated Services, Network Working Group, Dec. 1998.
Shah et al., Internal Draft., ARP Meditation for IP Networking of Layer 2 VPN, Jul. 2007.
Martini et al., Internet Draft Segmented Pseudo Wire, Network Working Group, Jul. 2007, 36 pages.
Pan et al., Internet Draft, Pseudo Wire Protection, Jul. 2006.
Rosen et al., Internet Draft, PWE3 Congestion Control Framework, Network Working Group, Mar. 2004.
Rosen et al., BGP/MPLS IP Virtual Private Networks (VPNs), Feb. 2006.
Pan, Ping, Internet Draft, Dry-Martini: Supporting Pseudo-wires in Sub-Ip Access Networks, Network Working Group, Jul. 2005.
McPherson et al., Pseudowire Emulation Edge to Edge (PWE3) Jun. 13, 2007, http://www.ietf.org/html.charters/pwe3-carter.html.
Vasseur et al., Path Computation Element (pce), May 9, 2007, http://www.ietf.org/html.charters/pce-charter.html.
Office Action dated Mar. 1, 2011 for U.S. Appl. No. 11/486,389, 36 pages.
Office Action dated Jul. 8, 2011 for U.S. Appl. No. 11/486,389, 33 pages.
Non Final Office Action dated Sep. 9, 2013 for U.S. Appl. No. 11/486,389, 41 pages.
Non Final Office Action dated Sep. 24, 2013 for U.S. Appl. No. 11/486,432, 34 pages.
Notice of Allowance mailed Mar. 17, 2014 for U.S. Appl. No. 11/486,389, 48 pages.
Final Office Action dated Apr. 30, 2014 for U.S. Appl. No. 11/486,432, 30 pages.
Martini et al., "Segmented Pseudo Wire", Network Working Group, Mar. 2006, published online at [http://tools.ietf.org/html/draft-ietf-pwe3-segmented-pw-02], retrieved Dec. 1, 2010, 32 pages.
Ould-Brahim."Multi-Segment Pseudo-Wires" Provisional Application U.S. Appl. No. 60/711,861, filed Aug. 26, 2005. (Non-Provisional Application later published as US20080253367 on Oct. 16, 2008).
Harry Newton, "Newton's Telecom Dictionary", 23rd updated and Expanded Edition, Flatiron Publishing, New York, Mar. 2007.
Martini et al., "Segmented Pseudo Wire", Network Working Group, Mar. 2006.
Provisional application. 60711861 of Ould-Brahim (US20080253367).

* cited by examiner

LIGHTWEIGHT CONTROL-PLANE SIGNALING FOR AGGREGATION DEVICES IN A NETWORK

CROSS REFERENCE TO OTHER APPLICATIONS

This application is a continuation of, and claims priority to, U.S. patent application Ser. No. 11/486,389, filed on Jul. 12, 2006, and entitled "LIGHTWEIGHT CONTROL-PLANE SIGNALING FOR AGGREGATION DEVICES IN A NETWORK," which claims priority to U.S. Provisional Patent Application No. 60/698,893, filed on Jul. 12, 2005, and entitled "SUPPORTING PSEUDO-WIRES IN SUB-IP ACCESS NETWORKS." The entireties of these related applications are incorporated herein by reference.

Control plane signaling between an aggregation device and one or more access devices is used to exchange control and management related information associated with, for example, user flows handled by the devices and/or the connection between the devices. For example, access devices need labels to encapsulate or otherwise identify traffic from different user flows. Control plane signaling may also be used to support detection of failures in a network. A typical technique to distribute labels is to use Label Distribution Protocol (LDP). Some of the features and capabilities provided by LDP are not needed in a control plane signaling between an aggregation device and one or more access devices and these features and capabilities contribute to the cost of devices. It would be desirable to develop less expensive and/or less complex control plane signaling techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a label is disclosed. In some embodiments, a label includes information associated with Multiprotocol Label Switching (MPLS) and/or a Virtual LAN (VLAN). A first message includes a set of available labels is transmitted to an access device. A second message is received from the access device and includes a label from selected from the set of available labels to be used by the access device. The set of available labels is updated to account for the label selected by the access device. In some embodiments, the process is performed by an aggregation device. In some embodiments, the process excludes using Label Distribution Protocol (LDP). In some cases this may reduce the cost of an access device and/or an aggregation device.

Figure 1:
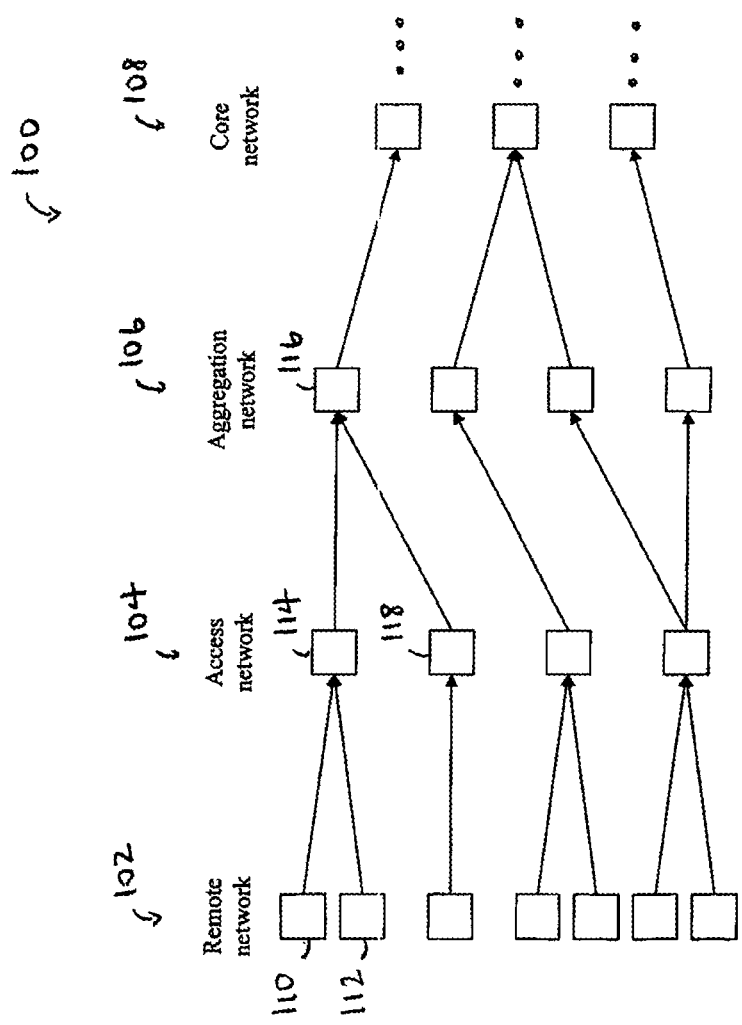
FIG. 1 is a system diagram illustrating an embodiment of a network.

FIG. 1 is a system diagram illustrating an embodiment of a network. In the example shown, network 100 comprises a variety of sub-networks. Devices in each of the sub-networks (e.g., remote network 102, access network 102, aggregation network 106, and core network 108) are not necessarily homogeneous. For example, remote device 110 and 112 may employ different types of network technologies. As traffic progresses from the edge of network 100 (e.g., from remote network 102) to the core (e.g., to core network 108), traffic is aggregated together and may be sent over higher bandwidth connections. For example, core network 108 includes one or more network backbones that have very high bandwidths. Although the figure shows traffic flowing from the edge to the core of network 100 to illustrate some points, traffic flows in both directions. Sub-networks and devices in those sub-networks perform processing to support the exchange of information in both directions (e.g., de-multiplexing traffic as traffic flows from the core to the edge of network 100).

Remote network 102 includes a plurality of remote devices, such as remote devices 110 and 112. A remote device is located at an end user's site, such as a home or an office, and provides connection to network 100. One or more user flows (also referred to as flows) of data are associated with each remote device (e.g., remote device 110). In some embodiments, a remote device is associated with a single user flow. Some examples of remote devices include broadband cable modems and (Asymmetric) Digital Subscriber Line ((A)DSL) modems.

Traffic from remote network 102 is collected and multiplexed at access network 104. Access network 104 includes a plurality of access devices. Remote devices may be grouped by location (e.g., they are located in the same neighborhood or building) and those remote devices are connected to access devices associated with that location. For example, in some applications, access devices are located at the local office of a cable company or telephone company and provide access for remote devices in the neighborhood of the local office Some examples of access devices are DSL Access Multiplexers (DSLAM) associated with DSL, Cable Modem Termination Systems (CMTS) associated with cable broadband, Gateway GPRS Support Nodes (GGSN) associated with wireless networks, Customer Premises Equipment/Multi-service SONET/SDH Provisioning Platforms (CPE/MSPP) associated with business leased lines, Optical Line Termination (OLT) that is responsible for connecting Passive Optical Networks (PON), which includes Broadband PON (BPON) and Ethernet PON (EPON), etc.

In some embodiments, a connection between access device 114 and aggregation device 116 is a lambda (photonic) connection, Synchronous Optical Network/Synchronous Digital Hierarchy (SONET/SDH) cross-connect, Asynchronous Transfer Mode (ATM)/frame relay circuit, or Ethernet Virtual LAN (VLAN) connection.

To identify a particular flow (e.g., originating from a particular remote device), an aggregation device and an associated access device use labels to encapsulate or otherwise identify traffic associated with a user flow exchanged between them. In some embodiments, what comprises a label varies depending upon the technology used in a particular embodiment. Some examples of label types include Multiprotocol Label Switching (MPLS) and Ethernet VLAN. An access device obtains using any appropriate technique (e.g., as a result of negotiating with an aggregation device as a peer, being assigned a label, selecting a label from a group of labels, etc.) one or more labels for user flow(s) that the access device handles.

Labels may be used in a data plane to transfer payload data or user flow content. Access device 114 in one example obtains two labels: one for the user flow associated with remote device 110 and another for the user flow associated with remote device 112. Core-bound traffic is received and encapsulated (or otherwise identified) using the appropriate label. For edge-bound traffic, access device 114 uses the encapsulated label to determine to which remote device to forward the traffic.

Aggregation network 106 includes aggregation devices that groom and aggregate traffic from associated access devices. Some examples of an aggregation device include an aggregation switch or router, multi-service edge device, etc. In some networks, a single aggregation device is connected to dozens to hundreds of access devices. An aggregation device may service access devices in a particular region (e.g., a city or metropolitan area) and is sometimes referred to as a metropolitan aggregator. In some embodiments, an aggregation device comprises multiple systems.

Core network 103 includes a plurality of core devices, each of which is coupled to a high bandwidth network backbone. In some embodiments a core device is an Internet Protocol/Multi Protocol Label Switching (IP/MPLS) router.

In some embodiments, aggregation devices support, monitor, or otherwise provide per-flow Quality of Service (QoS). To do so, aggregation devices in some embodiments obtain QoS related information, for example from the respective access device that handles a particular user flow. In some embodiments, aggregation devices perform or support Operation, Administration, and Maintenance (OAM). For example, an aggregation device may be responsible for protection/recovery in the event of equipment and/or facility failure. To support these functions, access devices and aggregation devices may identify each user flow with a label. For example, by encapsulating traffic with the appropriate label, an aggregation device is able to monitor traffic on a per flow basis, track and/or manage QoS performance, etc.

A typical technique to distribute a label to an access device is to use Label Distribution Protocol (LDP). LDP is a peer to peer process where, for example, access device 114 and aggregation device 116 are peer devices that negotiate with each other to obtain labels to use. Aggregation device 116 may also negotiate with access device 118 using LDP, but for clarity the LDP process is described with respect to only access device 114 and aggregation device 116 As an example of an LDP process, access device 114 and aggregation device 116 perform session discovery, for example using IP routing and/or Interior Gateway Protocol (IGP). Session setup is then performed, for example using Transmission Control Protocol (TCP). Labels are then negotiated between access device 114 and aggregation device 116. Each device may have its own label space, inform the other device about its label space, and negotiate labels to use, for example so that the label spaces are non-overlapping. Flow attributes may also be exchanged. Flow attributes include characteristics, properties, settings, or other values associated with a user flow or a connection. In some embodiments, flow attributes include QoS values, traffic characteristics, status or slate information, ID information, etc. Flow attributes may be used by an aggregation device to monitor, schedule, groom, aggregate, and/or otherwise process traffic (in some embodiments on a per-flow basis).

In some cases, there are certain aspects about using LDP and/or other current techniques that are undesirable. For example, LDP was developed for IP routers in a backbone environment and LDP is therefore a peer to peer process. An access device and an aggregation device may be one-hop away in a network. Peer to peer negotiation is not necessary and other techniques may be sufficient to obtain a label and perform other control plane functions. Another aspect of LDP that may be undesirable is the lack of OAM capabilities. In some applications OAM capabilities are very important. For example, a user typically only has one remote device via which access to a network is available. If a remote device or other portion of a network goes down, there may be no backup device or connection via which the network is accessible to a user. In some applications, network providers would like to know within, for example, a few seconds about a failure or other error. LDP does not provide per-flow OAM and to support per-flow OAM, other technology, such as Pseudo-Wire Virtual Circuit Connectivity Verification (VCCV), is used in addition to LDP to support per-flow OAM. Adding this additional technology may add complexity. Another issue may be cost. For example, an aggregation device may interface with hundreds of access devices. To support LDP, each aggregation device may be required to maintain hundreds of TCP and LDP sessions in the control plane. This may add performance overhead and cost to aggregation devices. Similarly, access devices may be required to support TCP and/or LDP sessions which may add to the cost of access devices.

Some other techniques associated with control plane signaling between an aggregation device and one or more access devices include ATM User-Network Interface (UNI) and Frame Relay Local Management Interface (LMI). These are technology specific solutions used in ATM and Frame Relay environments. A technique that is able to support a variety of technologies (and in some embodiments simultaneously interface to different types of technologies) would be desirable.

Figure 2:
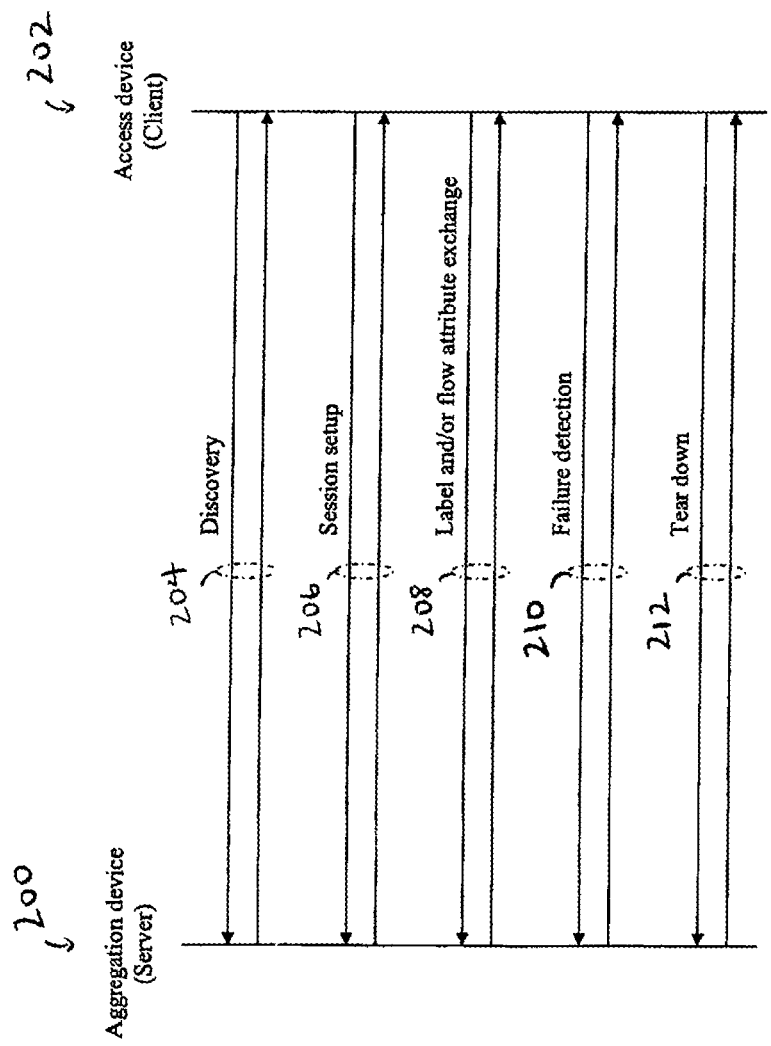
FIG. 2 is a diagram illustrating an embodiment of control plane signaling performed between an aggregation device and an access device.

FIG. 2 is a diagram illustrating an embodiment of control plane signaling performed between an aggregation device and an access device. In the example shown, aggregation device 200 and access device 202 act as a server and a client, respectively, rather than interacting with each other as peers (e.g., as in a scenario that uses LDP). Although this exam ale illustrates a single access device communicating with aggregation device 200, in some applications an aggregation device performs similar control plane signaling with additional access devices. In some cases, an aggregation device interfaces to hundreds of access devices.

Aggregation device 200 and access device 202 perform discovery 204 and session setup 206. Any appropriate technique may be used to perform discovery 204 and session setup 206.

In some embodiments, aggregation device 200 sends probe messages toward access device 202. If access device 202 is interested in label setup, it will respond to the probe message. A probing reply message may include information, such as capacity, speed, functional capability, and/or vendor type, for access device 202. Aggregation device 200 will therefore know the existence of access device 202, and associated physical and/or logical characteristics and/or capabilities. In some embodiments, access device 202 sends a request toward aggregation device 200. If aggregation device 200 accepts the request, access device 202 and aggregation device 200 can begin communicating with each other. In some embodiments, the operators can configure access device 202 and aggregation device 200 with the appropriate information, so that they can communicate with each other.

In some embodiments, as soon as access device 202 and aggregation device 200 have discovered each other, they can setup a session and begin to exchange label and/or flow attributes. The session setup sequence 206 can be an explicit message between access device 202 and aggregation device 200, or an implicit acknowledgement about each other's existence.

During label and/or flow attribute exchange 208, labels and flow attributes are exchanged between aggregation device 200 and access device 202. Some embodiments of exchange 208 are described in further detail below. At the end of exchange 208, access device 202 has obtained one or more labels to encapsulate traffic associated with user flows managed by that access device. Aggregation device 200 at the end of exchange 208 has obtained flow attributes for users flows associated with access device 202. Some examples of flow attributes include QoS information (e.g., so that per-flow QoS is supported), remote status, etc. Aggregation device 200 may use this information for a variety of purposes, such as supporting QoS requirements, properly aggregating and/or grooming traffic from different user flows, etc.

Failure detection 210 is used to detect failures. For example, in some embodiments, access device 202 signals or otherwise informs aggregation device 200 when a remote device (or a connection associated with the remote device or a user flow associated with a remote device) has an error or a failure. In some embodiments, an aggregation device is notified about a failure as soon an access device detects or becomes aware of a failure. For example, in some systems there may be minimum failure/error detection time of a few seconds. Some embodiments of failure detection 210 are described in further detail below.

Tear down 212 is used to end or otherwise tear down a connection between aggregation device 200 and access device 202. For example, in some embodiments, labels claimed by access device during exchange 202 are released for use by other access devices. In some embodiments, only part of a connection is torn down. For example, an access device may interface with two remote devices, each with its own user flow. An access device may inform an aggregation device that one of the connections is being torn down (e.g., and release the label associated with that user flow) but the other connection will be maintained. Some embodiments of tear down 212 are described in further detail below.

In some embodiments, the example control signaling is able to be used in an environment that includes different types of network technologies. For example, a given aggregation device may communicate with a plurality of access devices, where the access devices are configured to support different technologies. For example, in some embodiments, an aggregation device is able to simultaneously interface with access devices that support Frame Relay, Ethernet, and/or MPLS.

Techniques for control plane signaling described herein are "light-weight." Access devices and/or aggregation devices that use the illustrated control plane signaling may be less complex and/or less expensive than some existing techniques or devices. The illustrated control plane signaling may also be more convenient because OAM capabilities are built-in (e.g., using failure detection 210) which may minimize complexity since OAM capabilities are not added-on.

In some embodiments, the illustrated control plane signaling is used in a pseudo wire network. For example, pseudo wires are used in some networks to aggregate different types of Layer 2 flows into a single trunk. Packets associated with a particular flow are encapsulated with an MPLS header and a Layer 2 specific control word.

In some embodiments described below (e.g., illustrating some examples of label and/or flow attribute exchange, failure detection, and tear down), messages are exchanged between an access device and an aggregation device. In some embodiments (including embodiments associated with the figures below), broadcast messages are used. For example, referring to FIG. 1, aggregation device 116 may generate a single message and broadcast it to access device 114 and 118. Using a broadcast message may reduce the number of control and/or management messages exchanged, thus reducing the amount of overhead. The type and/or format of a message may be selected as appropriate. In some embodiments, a message is an IP packet or a User Datagram Protocol (UDP) packet.

Figure 3:
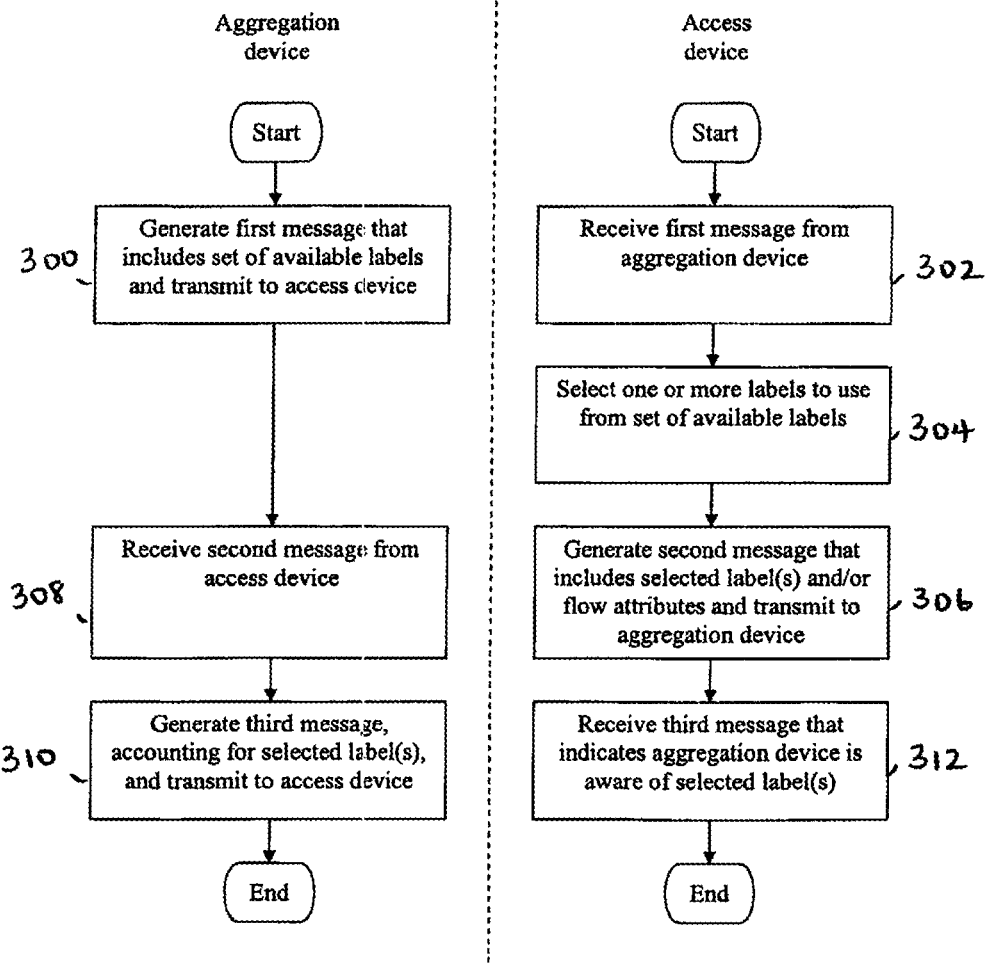
FIG. 3 is a flowchart illustrating an embodiment of a process for exchanging labels and/or flow attributes.

FIG. 3 is a flowchart illustrating an embodiment of a process for exchanging labels and/or flow attributes. In the example shown, an access device and an aggregation device exchange messages to obtain labels and flow attributes, respectively, that are used to monitor, manage, encapsulate, or otherwise process traffic. In some embodiments, the illustrated process is used at 208 to exchange label and flow attribute information. This is one example for exchanging labels and/or flow attributes and a variety of other techniques (e.g., push versus pull) may be used in addition to or in combination with the examples discussed herein.

At 300, a first message that includes a set of available labels is generated and transmitted to an access device. For example, the set of available labels may be determined by the aggregation device to be appropriate or otherwise proper for use by access devices to encapsulate or otherwise identify user flows. In some embodiments, the first message is broadcast to one or more access devices.

A first message is received from an aggregation device at 302. One or more labels are selected from the set of available labels to be used at 304. In some embodiments, an access device selects enough labels so that there is one label obtained for each user flow managed by that access device. In some embodiments, a single label is obtained and used for all user flows. A second message that includes the selected label(s) and/or flow attributes is generated and transmitted to an aggregation device at 306. In some embodiments, flow attributes include QoS values, a flow identifier, a remote status (e.g., the status of a remote device), and/or an interface ID (e.g., an IP address). Referring to the example of FIG. 1, QoS related information or other flow related information may be sent from access device 114 to aggregation device 116 regarding user flows associated with remote devices 110 and 112.

At 308, a second message is received from an access device. At 310, a third message, accounting for the available label(s), is generated and transmitted to an access device. In some embodiments, the format or type of message generated and transmitted at 310 is the same format or type of message generated and transmitted at 300. For example, in some embodiments, a message generated at 300 includes a set of available labels and/or a set of labels that are in use. A message generated and transmitted at 310 may update the set of available labels so the selected labels are removed and/or the selected labels may be added to the set of labels that are in use. Any appropriate encoding technique may be used to indicate that an aggregation device is aware of the label(s) that have been claimed by an access device. In some embodiments, transmission of a message 310 waits for a periodic or pre-approved transmission time. In some embodiments, the third message is broadcast to one or more access devices.

At 312, a third message is received that indicates an aggregation device is aware of label(s) that have been selected by an access device. In some embodiments, an access device retransmits a message at 306 until an aggregation device becomes aware that the access device has claimed label(s) from the set of available labels. In some embodiments, an access device does not use a label (e.g., to encapsulate traffic using the label), until an aggregation device indicates it is aware that the access device has claimed a label for use.

In various embodiments, various rules associated with initiating a message and/or responding to a message are used. in some embodiments, an aggregation device periodically generates and transmits messages with a set of available labels (i.e., at 300). For example, a message may be generated and transmitted by an aggregation device every 1-5 seconds. Access devices may come on-line over a period of time, and periodically generating and transmitting messages at 300 may enable new access devices to obtain label(s). In some embodiments, an aggregation device waits to receive a request from an access device before informing the requesting access device about what labels are available.

In some embodiments, response rules associated with generating and transmitting a second message at 306 and/or a third message at 310 are used. For example, in some embodiments, a device must always respond to a message. In some embodiments, a device only responds when some state or status has changed. For example, an access device may have already claimed some labels for use. If a new remote device comes on line, the access device responds at 306 to claim a new label for the new flow. Otherwise, an access device in such embodiments does not respond. In some embodiments, an access device cannot exceed a certain amount of time without responding to a message, even if the state of an access device (or remote devices and/or flows associated with it) has not changed. In some embodiments, rules associated with minimum times between transmissions are associated with OAM functionality. For example, if traffic is not received from a particular access device, remote device, or a user flow within a certain amount of time, an associated aggregation device declares a failure or other error.

Figure 4:
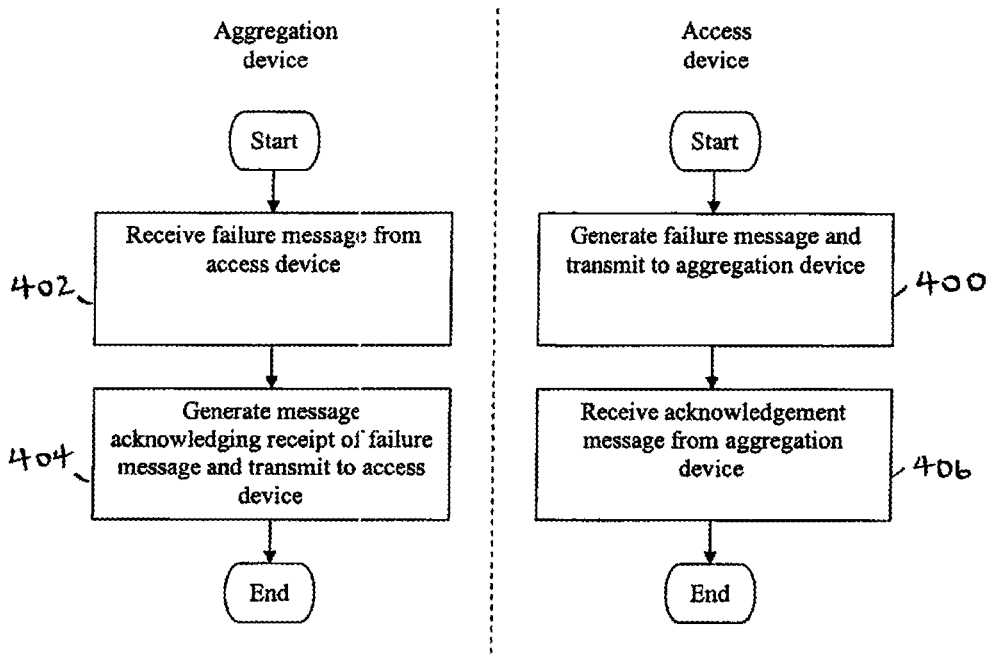
FIG. 4 is a flowchart illustrating an embodiment of a process for detecting failures.

FIG. 4 is a flowchart illustrating an embodiment of a process for detecting failures. In some embodiments, the example process is used at 210 to perform failure detection. In the example shown, the illustrated process provides built-in OAM capabilities. In various embodiments, a failure or error that is detected is associated with a remote device, a user flow, or a connection.

At 400, a failure message is generated and transmitted to an aggregation device. In some embodiments, a failure message identifies the device, user flow, or portion of a network that has failed. A variety of identifiers such as a flow ID, label, remote device identifier, or IP address may be used to identify the point of failure. In some embodiments, a remote status is included in a failure message. For example, there may be many possible errors or failures that can occur and a remote status in some embodiments is used to provide more information about the particular state or condition of the failure or error.

A failure message is received from an access device at 402. A message acknowledging receipt of a failure message is generated and transmitted to an access device at 404. An acknowledgement message is received from an aggregation device at 406.

In various embodiments, transmission of a message at 400 occurs at a variety of times and/or in combination with other information. In some embodiments a failure message is generated and transmitted immediately. For example, it may be important to be able to quickly detect a failure. In some applications, overhead associated with exchanging control and/or management messages is a concern, or control/management messages are typically exchanged very frequently. In such applications, it may be acceptable and/or desirable for an access device to wait for the next periodically occurring or pre-approved transmission time to transmit a message at 400. In some embodiments, failure information is "piggybacked" on another message or combined with other information.

In some embodiments, an access device repeats transmission of a failure message until an aggregation device acknowledges that it is aware of a failure. In some embodiments, acknowledgement (i.e., steps 404 and 406) is not performed, and/or additional processes are used in combination with the example process to detect failures. For example, if an aggregation device does not receive a failure message at 402, another technique used in addition to the example process may be sufficient to detect a failure in an acceptable amount of time. For example, in some embodiments traffic is examined by an aggregation device and if traffic for a user flow is not received within a certain amount of time, an error or failure is detected.

Figure 5:
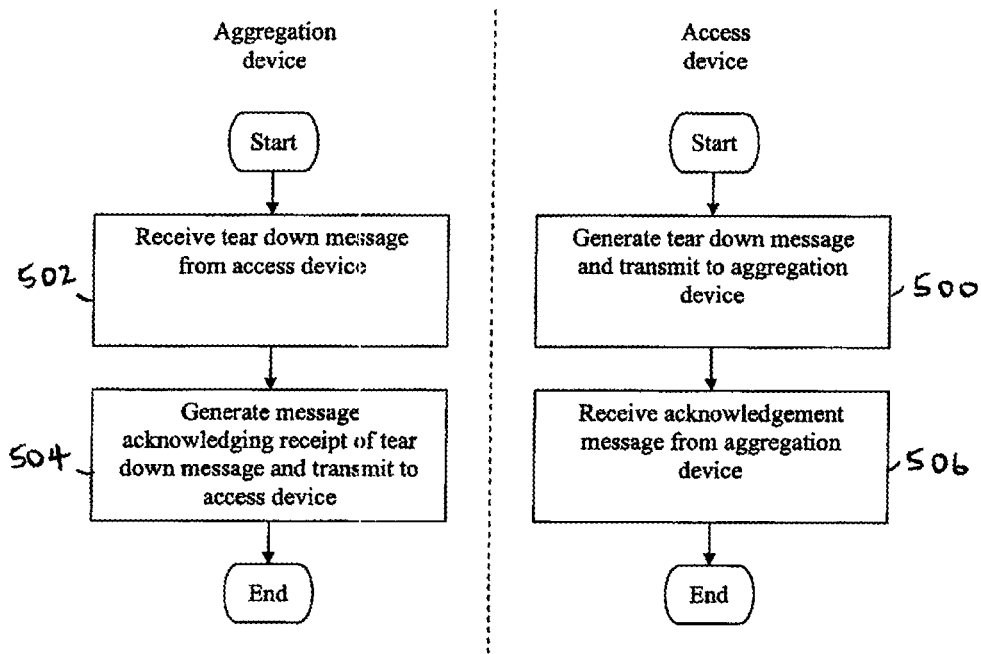
FIG. 5 is a flow chart illustrating an embodiment of a process for tearing down a connection.

FIG. 5 is a flowchart illustrating an embodiment of a process for tearing down a connection. In the example shown, a tear down message is used to indicate to an aggregation device when a connection associated with an access device is going down. In some embodiments, not all links or connections are being brought down. For example, access device 114 may use the illustrated process to indicate to aggregation device 116 that remote device 110 (or a user flow associated with remote device 110 or a connection between remote device 110 and access device 114) is going down. However, remote device 112, user flows associated with remote device 112, and/or a connection to remote device 112 may still be operating.

At 500, a tear down message is generated and transmitted to an aggregation device. In some embodiments, an identifier is included in tear down message, identifying the user flow, device, or connection that is being torn down. For example, identifiers such as a flow ID, an IP address, or a label may be included in a tear down message.

In some embodiments, a tear down message is the same type of message used to reserve or claim a label. Referring to the example of FIG. 3, the message generated at 500 in some embodiments is the same type of message that is generated at 306 except, for example, the set of selected labels at 500 is a null or empty set. In some embodiments, transmission of a message at 500 is triggered by receipt of a message from an aggregation device that includes a set of available labels.

A tear down message is received from an access device at 502. In some embodiments, an aggregation device maintains a record of labels that are in use. Upon receipt of a tear down message, an aggregation device may remove the labels used by the access device from the record of labels that are in use and/or recycle the labels and make them available to other access devices. At 504, a message acknowledging receipt of a tear down message is generated and transmitted to an access device. An acknowledgment message is received from an aggregation device at 506.

In some embodiments, an acknowledgement message uses the same type or format as message used to advertise or otherwise make access devices aware of available labels (e.g., the message generated at 300). For example, a message generated at 504 may include an update set of available labels and/or an updated set of labels in use. In some embodiments, transmission at 504 of an acknowledgment message (which may or may not be combined with other information) does not occur until a pre-approved or periodically occurring transmission time (e.g., a periodic transmission at 300 of available labels).

In various embodiments, the example process is modified as appropriate for the configuration or desired performance of an embodiment. For example, in some embodiments, an access device transmits a tear down message until an aggregation device acknowledges receipt of the tear down message (i.e., steps 504 and 506). In some embodiments, acknowledgement of a tear down message is not performed. For example, a connection between an access device and an aggregation device in some networks is a wired connection and the associated packet error rate is very low (e.g., on the order of $10^{-9}$). It may be acceptable to assume that a tear down message will be properly received and processed without performing message error detection and/or message retransmission.

Figure 6:
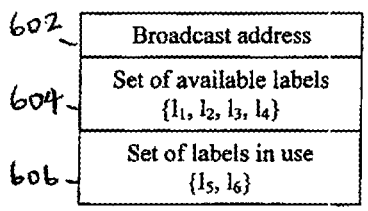
FIG. 6 is a diagram illustrating an embodiment of a message that includes a set of available labels.

FIG. 6 is a diagram illustrating an embodiment of a message that includes a set of available labels. In the example shown, message 600 is transmitted by an aggregation device to one or more access devices that are connected to the aggregation device.

Message 600 includes broadcast address 602. By using a broadcast address (as opposed to an address that is associated with a single device), a single message may be used to advertise available labels to all access devices connected to the transmitting aggregation device. Field 604 includes a set of available labels, $\{l_1, l_2, l_3, l_4\}$. Access devices that receive message 600 select labels for their use from this set. Field 606 includes a set of labels in use, $\{l_5, l_6\}$. An aggregation device may use this field to communicate to an access device that a selection or claim regarding a label has been received. In some embodiments, a flow ID or other identifier is included for each label in the set of labels in use.

Figure 7:
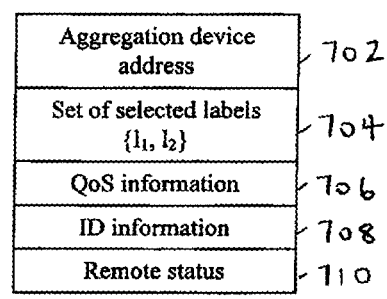
FIG. 7 is a diagram illustrating an embodiment of a message that includes flow attributes.

FIG. 7 is a diagram illustrating an embodiment of a message that includes flow attributes. In the example shown, message 700 is transmitted from an access device to an aggregation device. In addition to flow attributes associated with the transmitting access device, a set of selected labels are included in message 700. In some embodiments, message 700 is transmitted in response to or is based at least in part on information included in message 600.

Message 700 includes aggregation device address 702. Address 702 is associated with the aggregation device to which message 700 is destined. Field 704 includes a set of selected labels, $\{l_1, l_2\}$ that have been selected by the transmitting access device for use by that access device. Field 706 includes QoS information; field 708 includes ID information; and field 710 includes a remote status. In some embodiments, fields 706-710 are repeated as needed based on the number of user flows or remote devices associated with the transmitting access device. For example, if there are two user flows associated with an access device, a message may include two QoS fields, two ID fields, and two remote status fields (one for each user flow). In some embodiments, QoS field 706, ID field 708, and/or remote status field 710 are optional fields. That is, an access device has the option to include one or more of those fields or not.

Figure 8:
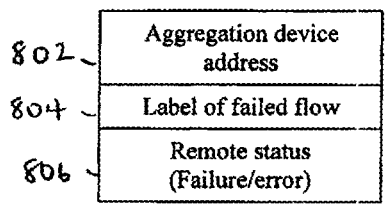
FIG. 8 is a diagram illustrating an embodiment of a failure message.

FIG. 8 is a diagram illustrating an embodiment of a failure message. In the example shown, failure message 800 is transmitted by an access device to an aggregation device. Using failure message 800, built in OAM capabilities may be supported (e.g., at the aggregation device that receives failure message 800). Other messages or information may be used in addition to or as alternative to message 800.

Failure message 800 includes aggregation device address 802 which is associated with the aggregation device to which failure message 800 is intended. Field 804 includes the label of a failed user flow. Field 806 includes the remote status associated with a failure or error. In some embodiments, remote status 806 is binary value (e.g., failure or no failure). In some embodiments, remote status includes codes to provide more precise information about the nature or state of the failure or error.

Figure 9:
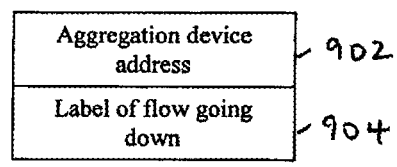
FIG. 9 is a diagram illustrating an embodiment of a tear down message.

FIG. 9 is a diagram illustrating an embodiment of a tear down message. In the example shown, tear down message 900 is transmitted from an access device to an aggregation device. In some cases, only a subset of user flows or connections associated with an access are going down.

Tear down message 900 includes aggregation device address 902 associated with an aggregation device to which message 900 is intended. Field 904 includes the label of a flow that is going down. In some cases, more than one flow is going down and field 904 is duplicated or includes multiple labels for the flows that are going down. In some embodiments, a receiving aggregation device recycles labels included in field 904 and makes them available for use by other access devices or flows.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by an access device comprising a processor, a first message from an aggregation device, wherein the first message identifies a set of available labels;
   selecting, by the access device, a label of the set of available labels for a flow; and
   initiating, by the access device, sending of a second message to the aggregation device, wherein the second message comprises at least a first field identifying the label, a second field comprising information associated with a quality of service for the flow, and a third field identifying a status of a device associated with the access device.

2. The method of claim 1, further comprising receiving a third message from the aggregation device, wherein the third message identifies an updated set of available labels that is based on the label selected by the access device.

3. The method of claim 1, wherein the receiving the first message comprises receiving the first message that further identifies a set of unavailable labels that are in use for one or more other flows.

4. The method of claim 1, further comprising:
initiating, by the access device, sending of a third message to the aggregation device indicating a release of the label; and
receiving, by the access device, a fourth message from the aggregation device, wherein the fourth message acknowledges the release of the label.

5. The method of claim 4, wherein the receiving the fourth message comprises receiving an updated set of available labels that includes the label.

6. The method of claim 1, further comprising reinitiating, by the access device, the sending in response to a determination that a third message identifying an updated set of available labels has not been received from the aggregation device within a defined time period after the initiating.

7. The method of claim 1, further comprising initiating, by the access device, sending of a third message to the aggregation device, wherein the third message requests transmission of the first message.

8. The method of claim 1, further comprising initiating, by the access device, sending of a third message to the aggregation device, wherein the third message indicates a failure of the flow and comprises at least a fourth field identifying the flow and a fifth field identifying a status of the device associated with the flow.

9. A system, comprising:
a receiver configured to receive, from an aggregation device, a first message identifying a set of available labels;
a processor configured to select a label from the set of available labels for a flow; and
a transmitter configured to send, to the aggregation device, a second message comprising at least a first field containing an identification of the label, a second field that specifies information associated with a quality of service for the flow, and a third field that identifies a status of a device associated with the flow.

10. The system of claim 9, wherein the label comprises information associated with at least one of multiprotocol label switching or a virtual local area network device.

11. The system of claim 9, wherein the transmitter is further configured to send the second message over at least one of a synchronous optical network/synchronous digital hierarchy cross-connect, an asynchronous transfer mode/frame relay circuit, or an Ethernet connection.

12. The system of claim 9, wherein the receiver is further configured to receive, from the aggregation device, a third message identifying a modified set of available labels that omits the label selected by the processor.

13. The system of claim 9, wherein the first message further identifies a set of unavailable labels that are reserved for one or more other flows.

14. The system of claim 9, wherein
the transmitter is further configured to send, to the aggregation device, a third message requesting that the label be disassociated from the flow, and
the receiver is further configured to receive, from the aggregation device, a fourth message acknowledging disassociation of the label from the flow.

15. The system of claim 14, wherein the fourth message identifies an updated set of available labels that includes the label.

16. The system of claim 9, wherein the transmitter is further configured to send, to the aggregation device, a third message requesting identification of the set of available labels.

17. The system of claim 9, wherein the transmitter is further configured to send, to the aggregation device, a third message identifying a failure of the flow, wherein the third message comprises at least a fourth field that identifies the flow and a fifth field that reports a status of the device associated with the flow.

18. A computer-readable storage device having stored thereon executable instructions that, in response to execution, cause an access device comprising a processing device to perform operations, comprising:
receiving a first message that identifies a set of labels made available for use by an aggregation device;
selecting a label of the set of labels for a flow; and
initiating sending of a second message comprising at least a first field identifying at least the label, a second field comprising at least information associated with a quality of service for the flow, and a third field identifying at least a status of a device associated with the access device.

19. The computer-readable storage device of claim 18, wherein the operations further comprise receiving a third message identifying an updated set of labels made available for use by the aggregation device, wherein the updated set of labels omits the label identified by the first field.

20. The computer-readable storage device of claim 18, wherein the operations further comprise:
initiating sending of a third message requesting a release of the label from the flow; and
receiving a fourth message acknowledging the release of the label by the aggregation device.

* * * * *